INVENTORS
CLARENCE L. ROGERS, JR.
CLARENCE A. RIPLEY, JR.

ATTORNEY

INVENTORS
CLARENCE L. ROGERS, JR.
CLARENCE A. RIPLEY, JR.

ATTORNEY

United States Patent Office 3,341,765
Patented Sept. 12, 1967

3,341,765
VARIABLE PULSE WIDTH REGULATED POWER SUPPLY
Clarence L. Rogers, Jr., Hartville, and Clarence A. Ripley, Jr., Akron, Ohio, assignors, by mesne assignments, to the United States of America as represented by the Secretary of the Navy
Filed July 31, 1964, Ser. No. 386,805
6 Claims. (Cl. 321—2)

ABSTRACT OF THE DISCLOSURE

A D.C. to D.C. voltage regulator for providing a constant D.C. output voltage from a D.C. energy input source which may vary in potential. Input power is fed into a power converter in the form of voltage pulses, the width of the voltage pulses being controlled by a multivibrator. The power converter produces an output voltage which is proportional to the area of the voltage pulses. A difference voltage between the output voltage and a reference voltage is fed to the multivibrator to cause a change on the input pulse width to compensate for variation in input potential.

---

Figure 1:
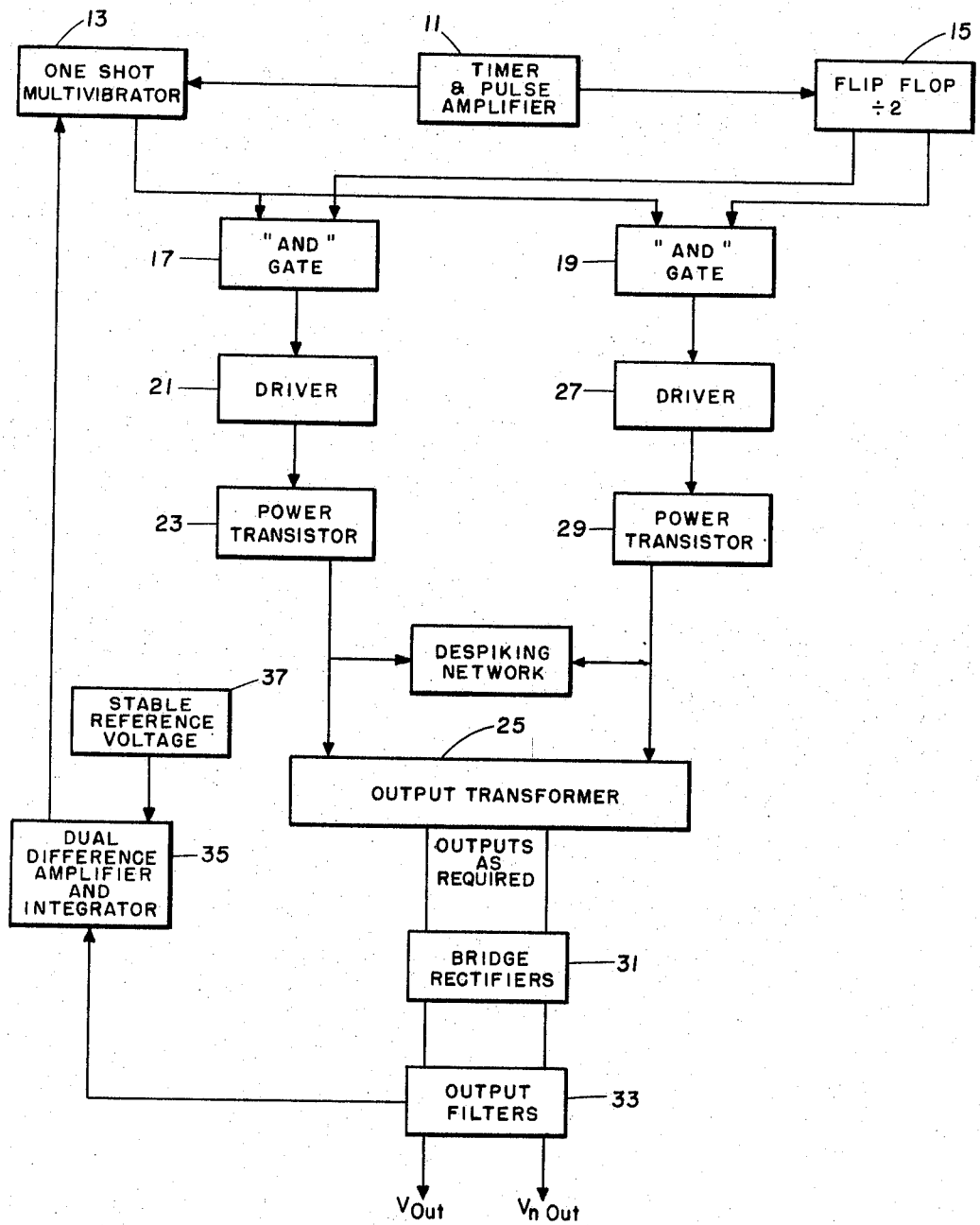

This invention relates to a D.C. to D.C. power or voltage regulator and more particularly to a voltage regulator in which the output voltage is maintained in a constant level by varying the width of input pulses fed into the regulator.

In the normal D.C. to D.C. power converter, the input voltage is chopped by a transistor-transformer combination to give a series of bidirectional pulses of the proper amplitude. These pulses have a constant duty cycle and an amplitude proportional to the input voltage. The bidirectional pulses are converted to unidirectional pulses and smoothed.

In the instant invention the variable pulse width power converter is used in which the output voltage is proportional to the area under the pulse. Thus as the input voltage source, a battery, for example, changes in potential the width of the pulse is automatically adjusted such that the area of the pulse remains the same and the output voltage remains the same. This system is used to maintain a number of discrete regulated output voltages which may vary from a magnitude of 10 volts or less to a magnitude of 250 volts or more, for example. In this invention, a sample output voltage is compared with a stable reference voltage, amplified and applied to a one shot multivibrator. This multivibrator determines the width of pulses applied to the power output circuit in accordance with the amplitude of the difference voltage applied thereto.

The frequency of the multivibrator is controlled by a high frequency relaxation oscillator timer.

Conversion efficiencies with a device of this invention have ranged from 0.8 to 0.86 with regulation of 0.22 to 1.2 percent at various output voltage levels.

An object of this invention is to provide a D.C. to D.C. power supply in which the output voltage is constant.

Another object of this invention is to provide a D.C. to D.C. power supply in which the pulse width of the control circuit is varied to compensate for variations in the supply voltage.

A further object of this invention is to provide a D.C. to D.C. regulated power supply for a plurality of discrete voltages other than the supply voltage.

Still another object of this invention is to provide a constant output voltage power supply in which the voltage is maintained constant by varying the duty cycle of the input voltage in proportion to the change of potential of the input supply voltage.

Yet another object of this invention is to provide an efficient nondissipative D.C. to D.C. regulated power supply using logic circuitry.

A still further object of this invention is to utilize a high frequency transistor gating in a D.C. to D.C. power supply to permit only the power required to maintain regulation to be drawn from the voltage source in addition to the power required by a load.

Figure 2:
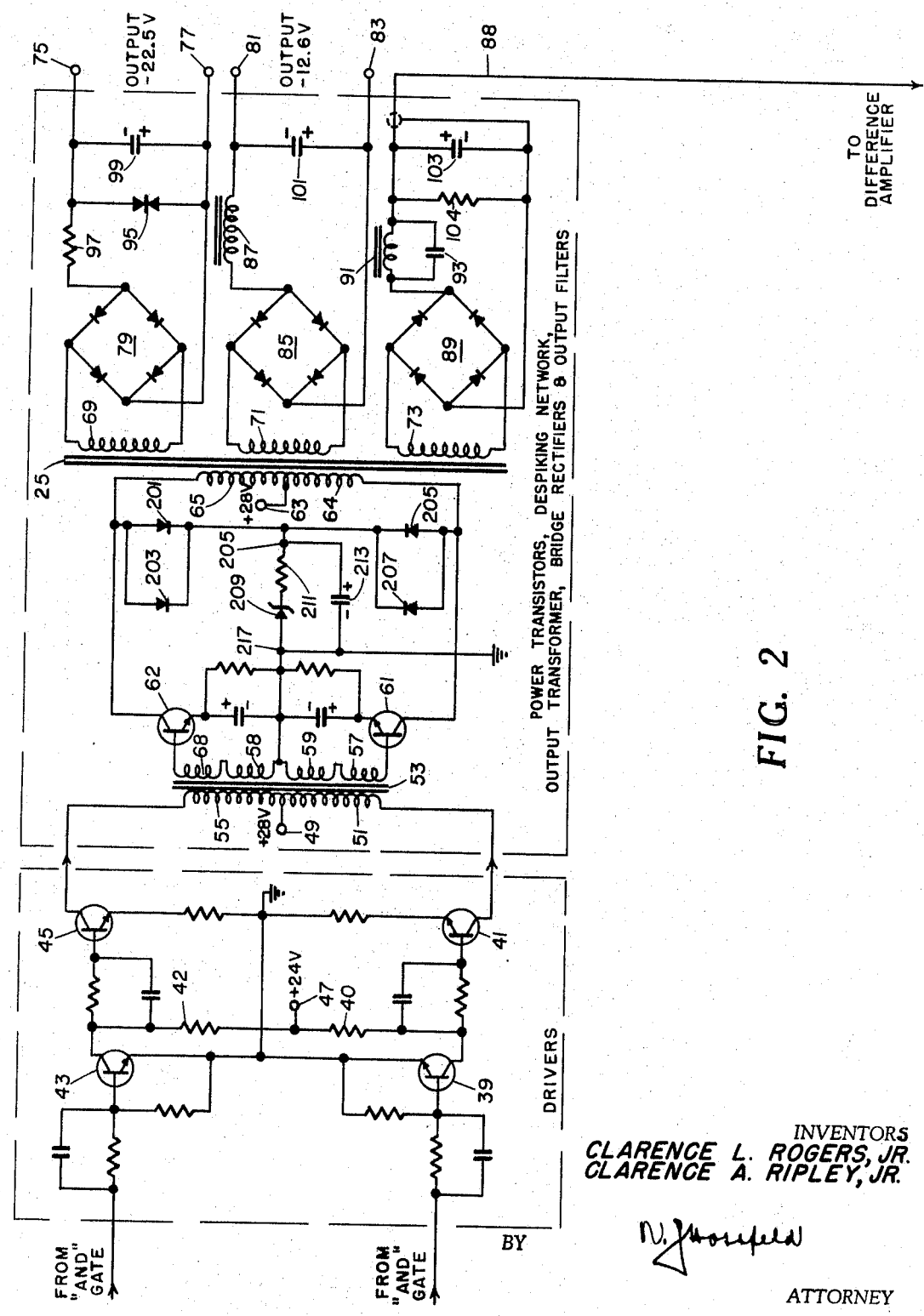
Figure 3:
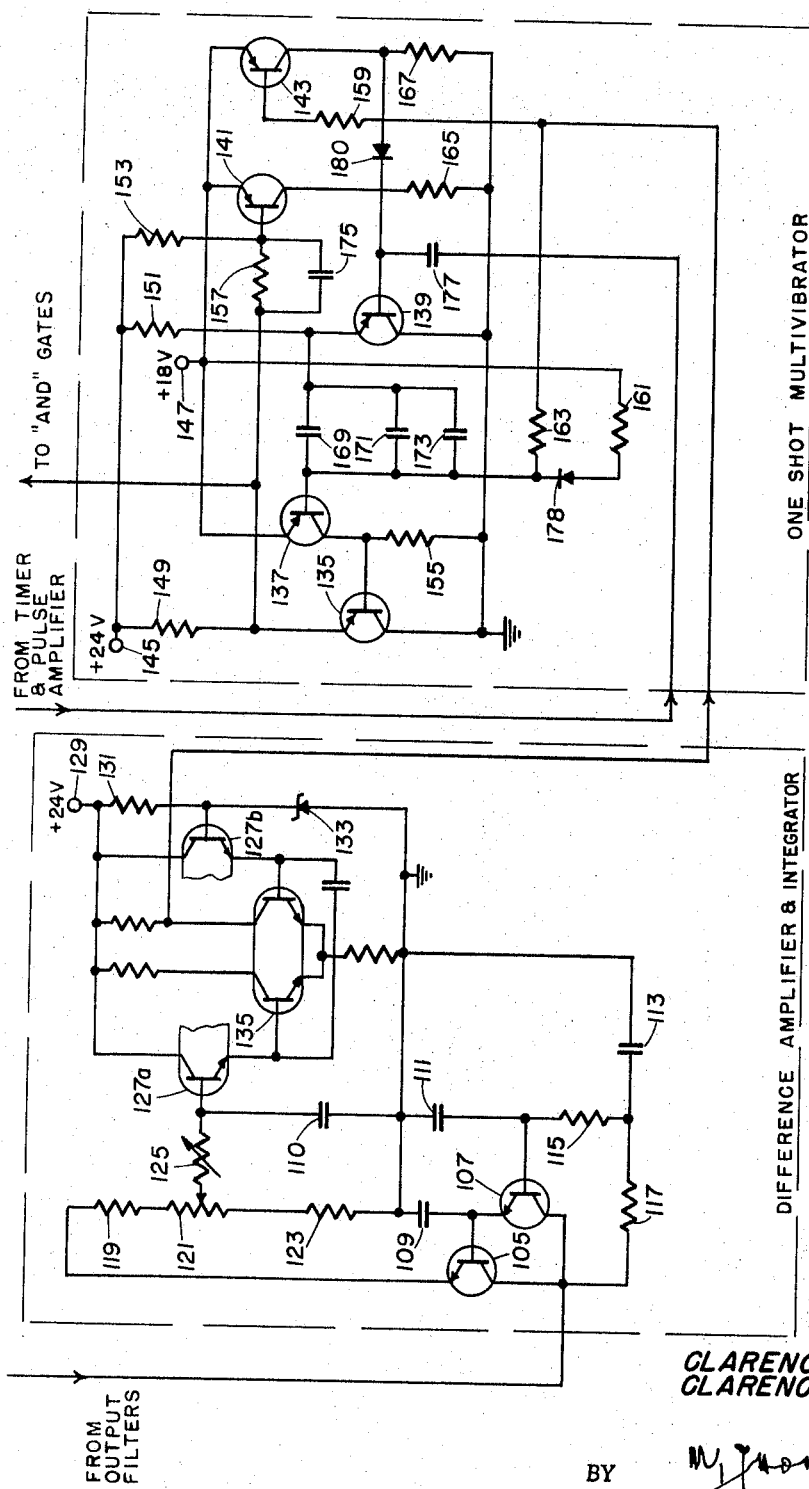

Other objects and many of the attendant advantages of this invention will be readily appreciated as the same becomes better understood by reference to the following detailed description when considered in connection with the accompanying drawings wherein:

FIG. 1 of the drawings illustrates in block diagram form the regulated power supply of the instant invention;

FIG. 2 of the drawings illustrates a schematic diagram of the drivers, power transistors, output transformer, bridge rectifiers, and output filters of this invention; and FIG. 3 of the drawings illustrates schematically the circuit diagrams of a signal integrator and difference amplifier, and the one-shot multivibrator.

Referring now to FIG. 1 of the drawings, a timer and pulse amplifier 11 is shown which connects to one-shot multivibrator 13 and to frequency dividing flip-flop 15. Timer and pulse amplifier 11 may include a relaxation oscillator having a frequency of approximately 10 kilocycles. The frequency dividing flip-flop 15 will have a frequency which is one-half of that of timer and pulse amplifier 11. In other words, if the frequency of timer and pulse amplifier 11 is 10,000 cycles, the frequency of flip-flop divider circuit 15 will be 5,000 cycles. The flip-flop dividing circuit 15 will act in synchronism with timer and pulse amplifier 11. The one-shot multivibrator 13 will produce pulses which vary in width from 20 milliseconds to 100 milliseconds and will be pulsed at the rate of the frequency of timer and pulse amplifier 11. With the timer and pulse amplifier 11 controlling the one-shot multivibrator, the pulse from the one-shot multivibrator will be applied to AND gates 17 and 19. With this arrangement a pulse from the one-shot multivibrator will be applied simultaneously to AND gate 17 and AND gate 19. Pulses will be alternately applied to AND gate 17 and AND Gate 19 from the flip-flop 15. When a pulse is applied from one-shot multivibrator 13 and from flip-flop 15 to AND gate 17 at the same time, the voltage pulse will be conducted through driver 21, power transistor circuit 23, and into the output transformer 25. During the next cycle of flip-flop 15 a voltage pulse from one-shot multivibrator 13 and the positive pulse from flip-flop 15 will cause AND gate 19 to conduct in which time a power pulse will flow through driver 27, power transistor circuit 29, and into the output transformer 25. Voltages developed in the secondaries of output transformer 25 will be applied to bridge rectifiers 31 and output filters 33 and to terminals $V_{out}$ and $V_{n\ out}$. The voltage level of one of the output filters will be applied to dual difference amplifier and integrator 35 in which this voltage is integrated, compared with stable reference voltage 37, amplified and applied to one-shot multivibrator 13.

Referring now to FIG. 2 of the drawings, voltage pulses from AND gate 17 and AND gate 19 are applied to the driver circuits including transistors 39 and 41, and transistors 43 and 45. The collectors of transistors 39 and 43 are supplied by a 24-volt positive potential from terminal 47 through resistors 40 and 42. A positive 28-volt source connected to terminal 49 will be effectively connected to the collectors of transistors 41 and 45 through windings 51 and 55 of transformer 53. The collector of power transistor 61 is connected to a positive 28-volt source terminal 63 through winding portion 64 of transformer 25. The base of power transistor 61 is connected to a ground potential through winding portion 57 and 59 of transformer 53. The collector terminal of power transistor 62 is connected to a positive 28-volt source terminal 63 through winding portion 65 of transformer 25. The base of power transistor 62 is connected to ground potential through winding portions 58 and 68 of transformer 53. The conduction of either winding 64 or 65 of transformer 25 will cause an output voltage in windings 69, 71, and 73. The voltage developed in winding 69 will be applied to output terminals 75 and 77 through bridge rectifier 79. A voltage developed across winding 71 will be applied to output terminals 81 and 83 through rectifier bridge 85 and inductor 87. The voltage developed across winding 73 is applied to output terminal conductor 88 through rectifier bridge 89 and parallel inductor 91 and capacitor 93. In the first output circuit having terminals 75 and 77 the diode 95 is connected to the rectifier bridge 79 in winding 69 through a resistor 97. Diode 95 may be a type known in the art as IN230. A storage capacitor 99 is used to stabilize the voltage output at terminals 75 and 77. In the output circuit of terminals 81 and 83 the capacitor 101 acts as a storage capacitor to keep the output voltage at a desired level. Similarly in the third output circuit or in the reference voltage output circuit a storage capacitor 103 is provided. A bleeder resistor 104 is provided which may have a value of 10,000 ohms. The voltage pulse from output terminal conductor 88 is fed to the integrator circuit and difference amplifier 35. This output voltage from terminal 88 is connected to the collectors of transistors 105 and 107 of the integrator circuit. The integrator circuit additionally comprises capacitors 109, 111, 113, resistors 115, and resistor 117. The integrated output voltage from the integrators is applied across the voltage divider comprising resistors 119, 121, and 123. A desired portion of the integrated output voltage is applied through resistor 125 to the base of transistor 127a. A stable reference voltage which is applied to the base of transistor 127b is derived from a 24-volt source which is connected to terminal 129. This 24-volt source is connected between terminal 129 and ground through resistor 131 and Zener diode 133. Zener diode 133 operates to maintain a constant voltage level at the base of transistor 127b. The difference voltage, that is, the difference potential between the output voltage from the integrator circuit and the voltage of the stable reference voltage at the base of transistor 127b is amplified in transistor 135 and the amplified difference voltage is applied to one-shot multivibrator 13. The one-shot multivibrator 13 is comprised of transistors 135, 137, 139, 141, and 143. These transistors may be of the type known in the art as 2N495. A 24-volt potential is applied at terminal 145 and an 18-volt potential is applied at terminal 147. Resistor 149 may have a value of 10 kilohms, resistor 151 may have a value of 1 kilohm, and resistor 153 may have a value of 47 kilohms. Resistor 155 may have a value of 33 kilohms, resistor 157 may have a value of 56 kilohms, and resistor 159 may have a value of 15 kilohms. Resistor 161 may have a value of 10 kilohms, resistor 163 may have a value of 5.6 kilohms, resistor 165 may have a value of 10 kilohms, and resistor 167 may have a value of 10 kilohms. Capacitors 169, 171, and 173 may be selected as desired. Capacitor 175 may have a value of 1000 picofarads or 1000 micromicrofarads, and capacitor 177 may have a value of .01 microfarad. The initiation of pulses from the one-shot multivibrator is determined from timer and pulse amplifier 11 and the duration of the pulse from the one-shot multivibrator depends upon the magnitude of the difference voltage applied from difference amplifier 35 to one-shot multivibrator 13. Diodes 178 and 180 may be of the type known in the art as FD300.

Referring now to FIGS. 1 and 2 of the drawings for a more detailed description of the operation of the dual drivers, power transistors, despiking network, and output transformer, the voltage pulses from AND gates 17 and 19 of FIG. 1 are fed to the dual driver circuits 21 and 27. Dual driver circuit 21 includes transistors 43 and 45 and dual driver circuit 27 includes transistors 39 and 41. With no pulse applied from AND gate 19 to the base of transistor 43, transistor 43 will be in a conducting state. When a negative pulse from AND gate 19 is applied to the base of transistor 43, conduction will stop and the 24-volt positive potential at terminal 47 will be applied to the base of transistor 45, causing transistor 45 to go into conduction. The conduction of transistor 45 will cause a drop of voltage in the collector circuit of transistor 45 to drop from 28 volts to approximately zero, causing the circuit flow through winding 55 of transformer 53. The application of a voltage to winding 55 will cause a voltage to be induced by transformer action in windings 58 and 68 as well as secondary windings 57 and 59. Assuming that this transformer action will cause a positive voltage at the base of transistor 62, transistor 62 will go into conduction causing a current flow through winding 65 of output transformer 67. When transistor 62 is turned on by a positive pulse at the base of transistor 62, a current will flow from terminal 63, having a 28-volt positive potential, through winding 65 to the collector of transistor 62. The flow of current through winding 65 will cause output voltages to be applied across windings 69, 71, and 73 of output transformer 67. During the next cycle the voltage pulse from AND gate 17 is applied to the base of transistor 39. Just prior to the application of the voltage pulse from AND gate 17, transistor 39 will be in a conducting state. The application of a negative pulse to the base of transistor 39 will cut off the conduction in transistor 39 and substantially a 24-volt positive potential will be applied to the base of transistor 41, causing transistor 41 to conduct. The conduction of transistor 41 will cause a current flow from terminal 49 through transistor 41 to ground. Current flow through winding 58 of transformer 53 will cause a positive voltage, for example, to be applied to the base of transistor 61, causing transistor 61 to conduct. The conduction of transistor 61 will cause a large portion of the positive 28-volt potential at terminal 63 to be applied across winding 64. As a result, a voltage will be induced in windings 69, 71 and 73.

The despiking network comprises diodes 201, 203, 205, 207, Zener diode 209, resistor 211, and capacitor 213. Zener diode and resistor 211 are serially connected between common juncture 205 and grounded terminal 217. Diodes 201 and 205 are ultrafast diodes of the type, for example, as the type known in the art as FD100. Diodes 203 and 207 are high conductance diodes. Diodes 201 and 205 conduct on a leading edge of a magnetizing current transient which occurs when the current through either transistor 62 or 61 is shut off. Capacitor 213 acts to store magnetizing current energy, which occurs within a microsecond after transistor 61 or 62 is cut off and then dissipate this energy at low current levels through resistor 211 and Zener diode 209. Resistor 211 provides a discharge rate for capacitor 213. Zener diode 209, which is a 56-volt diode establishes a clipping level of 56 volts for voltage spikes which occur in the circuit when conduction of either tubes 61 or 62 are cut off. High voltage protection and thus reliable operation is thus attained for the gating power transistors 61 and 62.

The unique design of the integrator and difference amplifier of FIG. 3 is facilitated by the use of a network comprising capacitors 110, 111, 109, 113 and resistors comprising resistors 117, resistor 115, in conjunction with transistors 105 and 107. In this network as used with the transistors a shaped frequency response occurs which provides high gain at frequencies below 6 cycles per second and lower gain at higher frequencies.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A D.C. to D.C. variable width regulated power supply comprising a plurality of regulated D.C. output voltage circuits, one of the said plurality of output voltage circuits providing a feedback voltage source, a relaxation oscillator timer and pulse amplifier, a one-shot multivibrator having a first input circuit, a second input circuit and an output circuits, means connecting said relaxation oscillator timer and pulse amplifier to the first input circuit of said one-shot multivibrator, a frequency dividing multivibrator having an input circuit and an output circuit, a first AND gate having first and second input terminals and an output terminal, a second AND gate having first and second input terminals and an output terminal, means connecting the output circuit of said one-shot multivibrator to said first terminals of said first and second AND gates, means connecting the output of said frequency dividing multivibrator to said second terminals of said first and second AND gates, a first power transistor having a base, a collector, and an emitter, a second power transistor having a base, a collector, and an emitter, an output transformer having a primary winding and a plurality of second windings, said primary winding having a center tap connected to a D.C. voltage source, means connecting a first end of said primary winding to the collector terminal of said first power transistor, means connecting a second end of said primary winding to the collector terminal of said second power transistor, first impedance means connecting the emitter of said first power transistor to a ground potential, second impedance means connecting the emitter of said second power transistor to a ground potential, first driving means including first switching means connected between said first AND gate and the base of said first power transistor, second driving means including switching means connected between said second AND gates and the base of said second power transistor for applying a positive voltage to the base of said second power transistor when a pulse is applied to said second driving means from said AND gate, causing said second power transistor to conduct, a plurality of bridge rectifier means, a plurality of filter means, means serially connecting each of said plurality of secondary windings to a respective bridge rectifier, a respective filter circuit, and a respective one of said output voltage circuits, whereby a plurality of regulated output voltages is provided, integrator means having an input circuit and an output circuit, difference voltage amplifier means having a first input circuit, a second input circuit and an output circuit, a stable reference voltage source, means connecting said feedback voltage source to the input circuit of said integrator means, means connecting the output circuit of said integrator means to the first input circuit of said difference voltage amplifier means, means connecting said stable reference voltage source to the second input circuit of said difference voltage amplifier means, means connecting the output circuit of said difference voltage amplifier to the second input of said one-shot multivibrator, the pulse width of said one-shot multivibrator being directly proportional to the magnitude of voltage applied thereto from the output circuit of said difference amplifier means.

2. In a D.C. to D.C. regulated voltage power supply, a first switching power transistor having a base, a collector, and an emitter, a second switching power transistor having a base, a collector, and an emitter, a power output transformer having a plurality of secondary windings connected to respective regulated voltage output circuits, said primary winding having a first terminal, a center tap, and a second terminal, means connecting the collector of said first power switching transistor to said first terminal, means connecting the collector of said second switching power transistor to said second terminal, impedance means connecting the emitter of said first transistor to a ground potential, second impedance means connecting the emitter of said second transistor to said ground potential, a D.C. voltage source, means connecting said voltage source to said center tap, means for applying voltage pulses alternately to the base of said first transistor and the base of said second transistor whereby a current may flow alternately through said first transistor and said first winding and said second transistor and said primary winding, a despiking network for preventing high voltages from being applied to said first and second transistors comprising, a first diode circuit including a first quick acting diode and a second normal acting diode connected in parallel relationship, a second diode circuit including a second quick acting diode and a second normal acting diode connected in parallel relationship, a common juncture means connecting first diode circuit between said first terminal and said common juncture, means connecting said second diode circuit between said second terminal and said common juncture, a Zener diode, a resistor, means serially connecting said Zener diode and said resistor between said common juncture and said ground potential, a capacitor, means connecting said capacitor between said common juncture and said ground potential whereby voltage spikes occurring at said first and second terminals may be clipped at a desired voltage level.

3. A D.C. to D.C. variable pulse width power supply comprising, a power transformer having a primary circuit and a plurality of secondary circuits, means for rectifying and means for filtering each of said output circuits, a first power transistor, a second power transistor, said first power transistor connecting a first portion of said primary circuit to a source of D.C. voltage, said second power transistor connecting a second portion of said primary circuit to said D.C. voltage source, a first AND gate having a first input circuit, a second input circuit, and an output circuit, a second AND gate having a first input circuit, a second input circuit, and an output circuit, means connecting the output circuit of said first AND gate to said first power transistor whereby said first power transistor may be gated and said primary circuit may be energized, means connecting the output circuit of said second
AND gate to said power transistor whereby said second power transistor may be gated to energize said second portion of said primary circuit, a difference amplifier having a first input circuit, a second input circuit, and an output circuit, means connecting a portion of said output circuit to said first input circuit of said difference amplifier, a stable reference voltage source, means connecting said stable reference voltage source to said second input circuit of said dual difference amplifier, a one-shot multivibrator having a first input circuit, a second input circuit, and an output circuit, means connecting the output circuit of said difference amplifier to a first input circuit of said one-shot multivibrator, a relaxation oscillator timer and pulse amplifier, means connecting said timer and pulse amplifier to the second input circuit of said one-shot multivibrator, a frequency dividing multivibrator, said frequency dividing multivibrator having an input circuit, a first output circuit, and a second output circuit, means connecting the first output circuit of said frequency divided to the first input circuit of said first AND gate and means connecting the second output circuit of said frequency divided to the first input circuit of said second AND gate, means connecting the output circuit of said one-shot multivibrator to said second input circuit of said first AND gate and to said second input circuit of said second AND gate whereby the pulse width of the input voltage to the output transformer may be varied in accordance with the difference voltage applied to said one-shot multivibrator.

4. In a D.C. to D.C. power regulator, a first gating transistor having a base, an emitter, and a collector, a second gating transistor having a base, a collector, and an emitter, a D.C. voltage source, a power output transformer having a primary winding, a core, and a plurality of output circuits, said primary winding having a center tap connected to said D.C. voltage source, means connecting one end of said primary winding to the collector terminal of said first gating transistor, means connecting the other end of said primary winding to the collector terminal of said second gating transistor, a first bias means connected between the emitter terminal of said first gating transistor and a ground potential, a second bias means connected between the emitter terminal of said second gating transistor and a ground potential, means alternately gating said first and second gating transistors, a despiking network comprising first diode means connected between a first end of said primary winding and a common juncture, second diode means connected between the other end of said primary winding and said common juncture, Zener diode means connected between said common juncture and a ground potential, capacitor means connected across or between said common juncture and said ground potential whereby voltage spikes occurring in the primary winding of said power transistor may be clipped at a desired level.

5. The apparatus of claim 4 in which the first diode means consists of a fast acting diode and a heavy current conducting diode connected in parallel relationship and said second diode means consists of a fast acting diode and a heavy current conducting diode connected in parallel relationship.

6. In a D.C. to D.C. variable pulse width regulated power supply having variable width input pulses applied to power transistors to produce output power pulses inversely proportional in width to the voltage magnitude of a power source, an output transformer having a primary winding, a core, a plurality of output circuits each having discrete regulated voltage levels, an integrator having an input circuit and an output circuit, means connecting one of said plurality of output circuits to the input circuit of said integrator whereby an output voltage may be applied to the input circuit of said integrator circuit, a stable reference voltage, difference amplifier means having an input circuit and an output circuit, means connecting the output circuit of said integrator to the input circuit of said amplifier means, means connecting stable reference voltage to said input of said amplifier means whereby the difference voltage between output voltage and said stable reference voltage may be amplified, a control circuit, for controlling the width of pulses fed to the primary winding of said output transformer, means connecting the output of said amplifier to said control circuit whereby the pulse width of voltage pulses applied to the input circuit of said output transformer will vary in accordance with the magnitude of said difference voltage.

References Cited

UNITED STATES PATENTS

| 2,991,410 | 7/1961 | Seike | 321—2 |
| 3,305,756 | 2/1967 | Doss et al. | 321—2 |

FOREIGN PATENTS

| 1,190,868 | 4/1959 | France. |

OTHER REFERENCES

Electronics, engineering edition, "Magnetic Inverter Uses Tubes or Transistors," pp. 158–161, March 14, 1958.

JOHN F. COUNCH, *Primary Examiner.*

W. H. BEHA, *Assistant Examiner.*